US010742017B2

United States Patent
Morimoto

(10) Patent No.: US 10,742,017 B2
(45) Date of Patent: Aug. 11, 2020

(54) SEMICONDUCTOR-SWITCH CONTROL DEVICE

(71) Applicant: Yazaki Corporation, Tokyo (JP)

(72) Inventor: Mitsuaki Morimoto, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 318 days.

(21) Appl. No.: 15/822,560

(22) Filed: Nov. 27, 2017

(65) Prior Publication Data

US 2018/0198271 A1   Jul. 12, 2018

(30) Foreign Application Priority Data

Jan. 11, 2017   (JP) ................. 2017-002676

(51) Int. Cl.

| | | |
|---|---|---|
| *H02H 3/08* | (2006.01) | |
| *H02H 3/087* | (2006.01) | |
| *H02H 3/44* | (2006.01) | |
| *H02H 9/02* | (2006.01) | |
| *H02M 1/00* | (2006.01) | |
| *H02H 7/122* | (2006.01) | |
| *H02H 5/04* | (2006.01) | |

(52) U.S. Cl.
CPC .............. *H02H 3/08* (2013.01); *H02H 3/087* (2013.01); *H02H 3/44* (2013.01); *H02H 5/041* (2013.01); *H02H 7/1227* (2013.01); *H02H 9/02* (2013.01); *H02M 2001/0009* (2013.01)

(58) Field of Classification Search
USPC .................................. 361/86–87, 93.7–93.9
See application file for complete search history.

(56) References Cited

U.S. PATENT DOCUMENTS

| | | | | |
|---|---|---|---|---|
| 6,313,690 | B1 * | 11/2001 | Ohshima ............ | H03K 17/0822 323/283 |
| 6,594,129 | B1 * | 7/2003 | Baba .................. | H03K 17/0822 361/87 |
| 2011/0242716 | A1 | 10/2011 | Ueta et al. | |
| 2012/0114099 | A1 | 5/2012 | Yoshida | |
| 2014/0077782 | A1 | 3/2014 | Cortigiani et al. | |

FOREIGN PATENT DOCUMENTS

| | | |
|---|---|---|
| CN | 102265475 A | 11/2011 |
| CN | 102551752 A | 7/2012 |
| CN | 103094875 A | 5/2013 |
| CN | 104009445 A | 8/2014 |
| JP | 2010-119261 A | 5/2010 |
| JP | 2012-208652 A | 10/2012 |

OTHER PUBLICATIONS

Communication dated Dec. 26, 2018, from the State Intellectual Property Office of People's Republic of China in counterpart Application No. 201810021825.X.

* cited by examiner

*Primary Examiner* — Danny Nguyen

(74) *Attorney, Agent, or Firm* — Sughrue Mion, PLLC

(57) ABSTRACT

A semiconductor-switch control device includes a controller that detects an analog signal of a load current, converts the detected analog signal into a digital signal, and determines an over-current based on the converted digital signal; a short circuit detector that detects an analog signal of a load voltage, and detects an over-current based on the analog signal without converting the detected analog signal into a digital signal; and a drive unit that drives an FET based on a determination result of the over-current determined by the controller or a detection result of the over-current detected by the short circuit detector.

2 Claims, 7 Drawing Sheets

SEMICONDUCTOR-SWITCH CONTROL DEVICE

CROSS-REFERENCE TO RELATED APPLICATION(S)

The present application claims priority to and incorporates by reference the entire contents of Japanese Patent Application No. 2017-002676 filed in Japan on Jan. 11, 2017.

BACKGROUND OF THE INVENTION

1. Field of the Invention

The present invention relates to a semiconductor-switch control device.

2. Description of the Related Art

Conventional electric vehicles and hybrid electric vehicles are equipped with a load section such as a motor, and a power source for driving the load section, and are provided with a switch that conducts or interrupts an electric current that flows from the power source to the load section for the purpose of safety. For this switch, a mechanical relay has been mainly used. In recent years, however, the use of a semiconductor switch has also been considered. A semiconductor-switch control device turns off the semiconductor switch and interrupts the current when an over-current that flows from the power source to the load section is detected by, for example, a microcomputer (for example, Japanese Patent Application Laid-open No. 2010-119261).

In the conventional semiconductor-switch control device, for example, because an over-current is detected by the microcomputer, it takes time before the over-current is detected, and thus there has been room for improvement in terms of this point.

SUMMARY OF THE INVENTION

The present invention has been made in view of the above-mentioned circumstances, and an object of the invention is to provide a semiconductor-switch control device capable of properly interrupting an over-current and protecting a circuit.

In order to solve the above mentioned problem and achieve the object, a semiconductor-switch control device according to one aspect of the present invention includes a semiconductor switch configured to conduct or interrupt a load current that is an electric current flowing from a power source to a load section; a determination unit configured to detect an analog signal of the load current or of a load voltage that is a voltage applied to the load section, convert the detected analog signal into a digital signal, and determine an over-current based on the converted digital signal; a detector configured to detect an analog signal of the load current or the load voltage, and detect an over-current based on the analog signal without converting the detected analog signal into a digital signal; and a drive unit configured to drive the semiconductor switch based on a determination result of the over-current determined by the determination unit or a detection result of the over-current detected by the detector.

According to another aspect of the present invention, in the semiconductor-switch control device, it is preferable that the determination unit determines an over-current according to Joule heat obtained based on the digital signal of the load current or the load voltage and based on a time elapsed after application of the load voltage.

According to still another aspect of the present invention, in the semiconductor-switch control device, it is preferable that the detector includes a comparator configured to, when an analog signal of the load current is equal to or greater than a predetermined reference current or when an analog signal of the load voltage is below a predetermined reference voltage, output to the drive unit a detection signal indicating an over-current and, when an analog signal of the load current is below the reference current or when an analog signal of the load voltage is equal to or greater than the reference voltage, output to the drive unit a detection signal indicating not being an over-current.

According to still another aspect of the present invention, in the semiconductor-switch control device, it is preferable that the detector outputs the detection signal indicating the over-current to the determination unit, the determination unit outputs, based on the detection signal indicating the over-current output from the detector, a state check signal to the detector, the detector outputs, based on the state check signal output from the determination unit, a detection check signal indicating whether the over-current has been detected to the determination unit, and the determination unit determines, based on the detection check signal output from the detector, a detection result of the over-current detected by the detector.

According to still another aspect of the present invention, in the semiconductor-switch control device, it is preferable that the determination unit include a central processing unit that determines the over-current by performing a plurality of processes in synchronization with a clock frequency.

According to still another aspect of the present invention, in the semiconductor-switch control device, it is preferable that the determination unit, in synchronization with the clock frequency, at least perform in sequence a first process of reading a command, a second process of deciphering the read command, a third process of determining an over-current based on the deciphered command, and a fourth process of outputting a result of the determination, and that determination intervals that the determination unit determines be an interval to perform the first process, the second process, the third process, and the fourth process.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

With reference to the accompanying drawings, a form (exemplary embodiment) to implement the present invention will be described in detail. The invention, however, is not limited by the content described in the following embodiment. Furthermore, the constituent elements described in the following include those that can be easily assumed by a person skilled in the art or that are substantially the same. The configurations described in the following can be combined as appropriate. Moreover, various omissions, substitutions, or modifications of the configurations can be made without departing from the scope of the invention.

Embodiment

A semiconductor-switch control device 1 according to the embodiment will be described. The semiconductor-switch control device 1 is a device that interrupts current and protects a circuit when an over-current that flows from a power source 2 to a load section 3 is detected. The following describes the semiconductor-switch control device 1 in detail.

Figure 1:
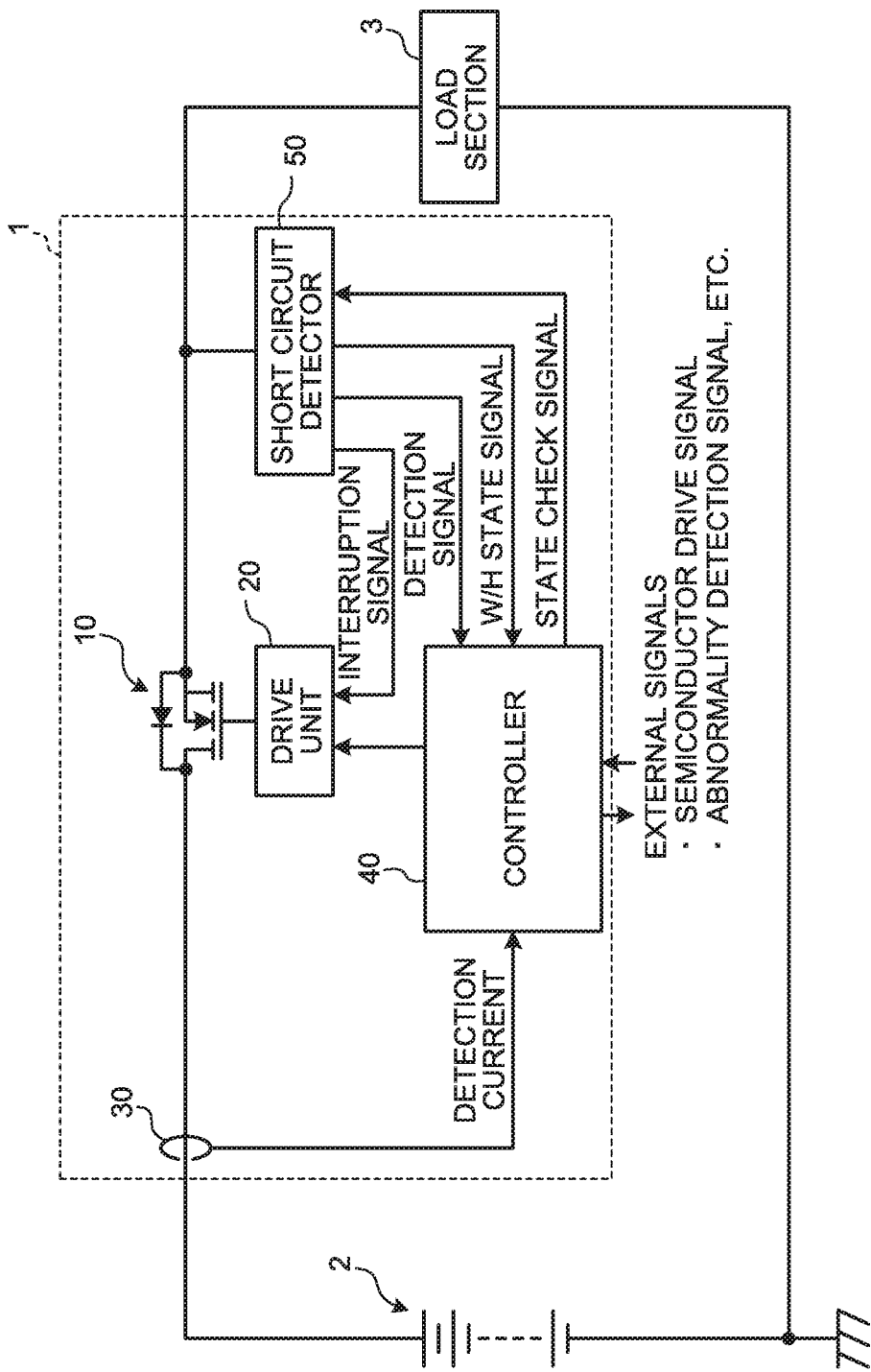
FIG. 1 is a block diagram illustrating a configuration example of a semiconductor-switch control device according to an embodiment.
Figure 2:
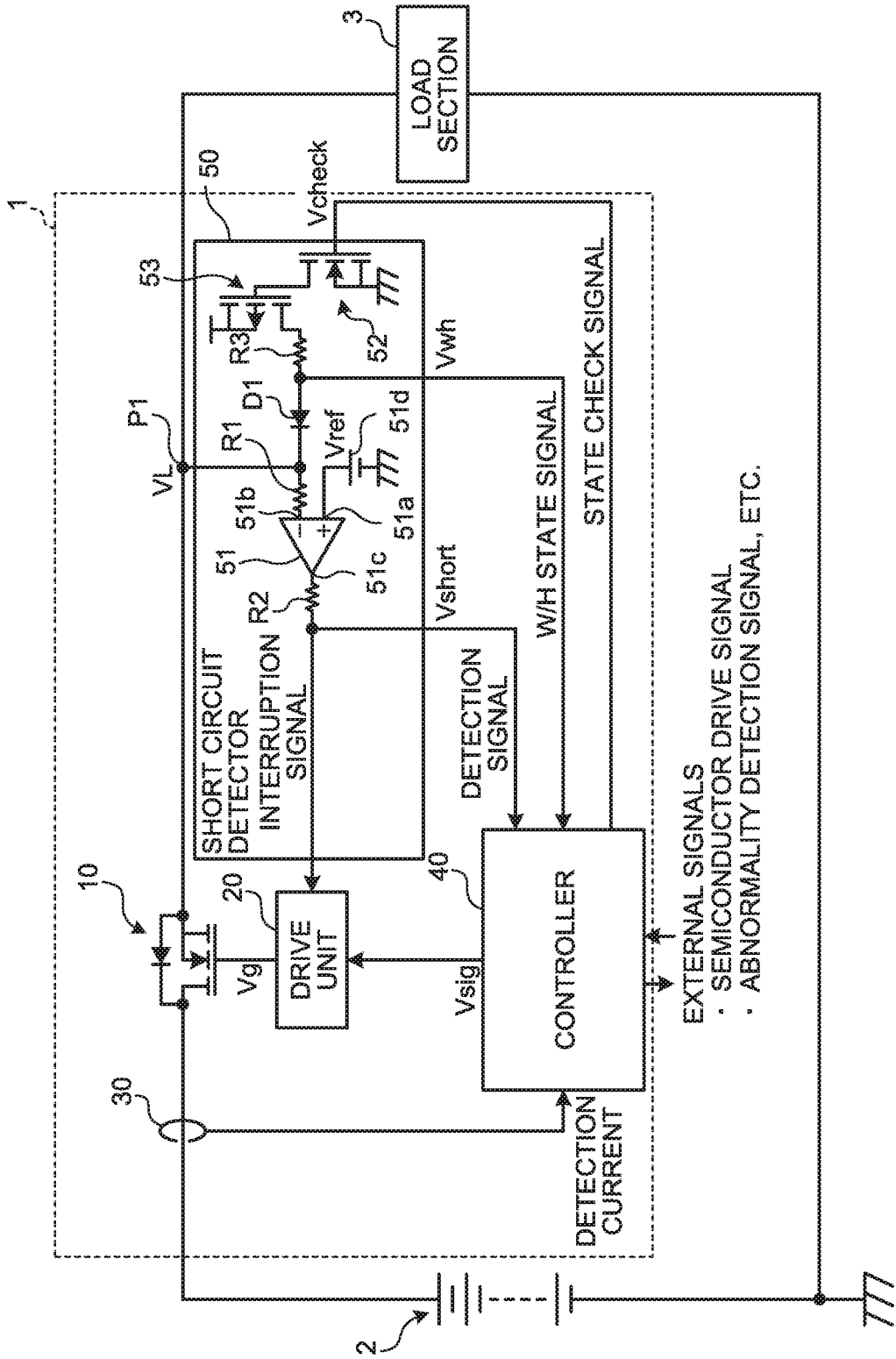
FIG. 2 is a circuit diagram illustrating a configuration example of a short circuit detector in the embodiment.

The semiconductor-switch control device 1, as illustrated in FIGS. 1 and 2, includes a field-effect transistor (FET) 10 as a semiconductor switch, a drive unit 20, a current sensor 30, a controller 40, and a short circuit detector 50 as a detector. The current sensor 30 and the controller 40 function as a determination unit.

The FET 10 is a switching element that turns on or off a load current that is an electric current flowing from the power source 2 to the load section 3. The FET 10 is an N-channel metal-oxide semiconductor (MOS) FET, for example. The FET 10 is installed between a positive terminal of the power source 2 and the load section 3. In the FET 10, a drain terminal is coupled to the positive terminal of the power source 2 and a source terminal is coupled to the load section 3. The FET 10 is arranged with a body diode (parasitic diode) in an opposite direction to the direction that the load current (forward current) flows. The FET 10 is driven by the drive unit 20 which will be described later, and conducts or interrupts the load current that flows from the positive terminal of the power source 2 to the load section 3.

The drive unit 20 is a circuit that turns the FET 10 on or off. The drive unit 20 is coupled to the controller 40 and a gate terminal of the FET 10. The drive unit 20 turns the FET 10 on or off based on a semiconductor drive signal Vsig output from the controller 40. For example, the drive unit 20 turns, based on the semiconductor drive signal Vsig, the FET 10 on by applying an on-voltage to the gate terminal of the FET 10 and supplies electricity by flowing the load current from the drain terminal to the source terminal. Furthermore, the drive unit 20 turns, based on the semiconductor drive signal Vsig, the FET 10 off by applying an off-voltage to the gate terminal of the FET 10, and interrupts the load current that flows from the drain terminal to the source terminal.

The drive unit 20 is further coupled to the short circuit detector 50. The drive unit 20 turns the FET 10 on or off based on a detection signal (interruption signal) output from the short circuit detector 50. For example, when the detection signal (interruption signal; a high-level signal) indicating an over-current is output from the short circuit detector 50, the drive unit 20 turns the FET 10 off by applying the off-voltage to the gate terminal of the FET 10 and interrupts the load current that flows from the drain terminal to the source terminal. Furthermore, when the detection signal (a low-level signal) indicating not being an over-current is output from the short circuit detector 50, the drive unit 20 maintains the on-voltage to the gate terminal of the FET 10 and flows the load current from the drain terminal to the source terminal.

The current sensor 30 is a circuit that detects the load current. The current sensor 30, for example, is a hall current sensor using a hall element that is a magneto-electric conversion element, and detects the load current in a non-contact manner. The current sensor 30 is not limited to the hall current sensor. The current sensor 30 is installed between the positive terminal of the power source 2 and the drain terminal of the FET 10, for example. The current sensor 30 is coupled to the controller 40, detects an analog signal of the load current that flows between the positive terminal of the power source 2 and the drain terminal of the FET 10, converts (A/D conversion) the analog signal of the detected load current (detection current) into a digital signal, and outputs the converted digital signal to the controller 40.

Figure 3:
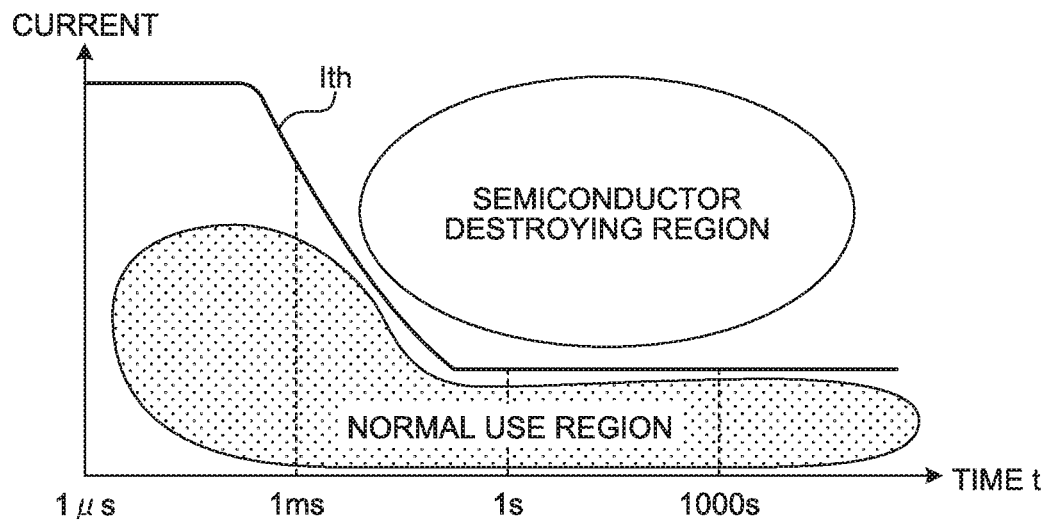
FIG. 3 is a diagram illustrating a current-limiting value of an FET in the embodiment.

The controller 40 is a circuit that determines an over-current. The over-current is an electric current that exceeds a current-limiting value that is guaranteed by a manufacturer for safe use. This current-limiting value is a current-limiting value that the FET 10 can supply electricity, for example. As illustrated in FIG. 3, a current-limiting value Ith of the FET 10 varies in conjunction with the elapsed time that the load current flows, for example. In the example illustrated in FIG. 3, the current-limiting value Ith falls off in conjunction with the lapse of time from an upper limit value at the time of 1 μs, and after the lapse of a fixed time (for example, after the lapse of a little less than 1 sec), converges to a lower limit value. Because the FET 10 is destroyed when the load current is equal to or greater than the current-limiting value Ith, suppressing the load current below the current-limiting value Ith can protect the FET 10.

The controller 40 includes an electronic circuit mainly composed of a known microcomputer including a CPU, a ROM and a RAM that constitute a storage unit, and an interface. The controller 40 performs a plurality of processes in synchronization with a clock frequency and determines an over-current. For example, the controller 40, in synchronization with the clock frequency, at least performs in sequence a first process of reading a command, a second process of deciphering the read command, a third process of determining an over-current based on the deciphered command, and a fourth process of outputting a result of the determination. The determination intervals (calculation period) that the controller 40 determines are an interval (period) of performing the first process, the second process, the third process, and the fourth process.

The controller 40 is coupled to the current sensor 30 and determines an over-current based on the digital signal of the load current output from the current sensor 30. The controller 40 determines an over-current based on the digital signal of the load current output from the current sensor 30 and a predetermined first threshold value Th1 (see FIG. 4), for example. The first threshold value Th1 is set smaller than the current-limiting value Ith. The controller 40 compares the digital signal of the load current output from the current sensor 30 with the first threshold value Th1 and, when the digital signal of the load current is equal to or greater than the first threshold value Th1, determines that an over-current has occurred, for example. The controller 40 further determines that no over-current has occurred when the digital signal of the load current output from the current sensor 30 is below the first threshold value Th1. Because an over-current is determined by comparing the digital signal of the load current with the first threshold value Th1 and there is no need to perform thermal calculation, the controller 40 can instantaneously determine an obvious over-current.

The controller 40 further calculates Joule heat based on the digital signal of the load current and the time elapsed after application of a load voltage that is applied to the load section 3. The Joule heat is heat energy (amount of heat) generated in a conductor by an electric resistance when electric current flows in the conductor. The controller 40 determines an over-current based on the Joule heat and a predetermined second threshold value Th2 (see FIG. 4), for example. The second threshold value Th2 is a threshold value of the amount of heat below which the load current is smaller than the current-limiting value Ith. The controller 40 compares the calculated Joule heat with the second threshold value Th2 and, when the Joule heat is equal to or greater than the second threshold value Th2, determines that an over-current has occurred, for example. The controller 40 further determines that no over-current has occurred when the Joule heat is below the second threshold value Th2. The controller 40 can, by determining an over-current based on the Joule heat, accurately determine an over-current that exerts thermal effect on the FET 10.

The short circuit detector 50 is a circuit that detects a short circuit. The short circuit detector 50 includes a comparator 51 and switching elements 52 and 53. The comparator 51 includes a positive input terminal 51a, a negative input terminal 51b, and an output terminal 51c. In the comparator 51, the positive input terminal 51a is coupled to a reference-voltage power source 51d that supplies a predetermined reference voltage Vref, the negative input terminal 51b is coupled via a resistor R1 to a connection point P1 at which the source terminal of the FET 10 and the load section 3 are coupled, and the output terminal 51c is coupled to the drive unit 20 via a resistor R2. The switching element 52 is an N-channel MOSFET, and the gate terminal is coupled to the controller 40, the drain terminal is coupled to a gate terminal of the switching element 53, and the source terminal is coupled to the ground. The switching element 53 is a P-channel MOSFET, and the gate terminal is coupled to the drain terminal of the switching element 52, the source terminal is coupled to a power source, which is not depicted, the drain terminal is coupled to the controller 40 via a resistor R3, and the drain terminal is further coupled via the resistor R3 and a diode D1 to the connection point P1 at which the source terminal of the FET 10 and the load section 3 are coupled.

The comparator 51 detects, from the negative input terminal 51b, an analog signal of a load voltage VL that is applied to the load section 3 and, without converting the detected analog signal into a digital signal, detects an over-current based on the analog signal. For example, the comparator 51 compares the analog signal of the load voltage VL detected from the negative input terminal 51b with the reference voltage Vref input from the positive input terminal 51a. Then, the comparator 51 outputs to the drive unit 20 an analog detection signal (interruption signal; a high-level signal) indicating an over-current when the analog signal of the load voltage VL is below the reference voltage Vref. The comparator 51 further outputs to the drive unit 20 the analog detection signal (a low-level signal) indicating not being an over-current when the analog signal of the load voltage VL is equal to or greater than the reference voltage Vref.

Figure 4:
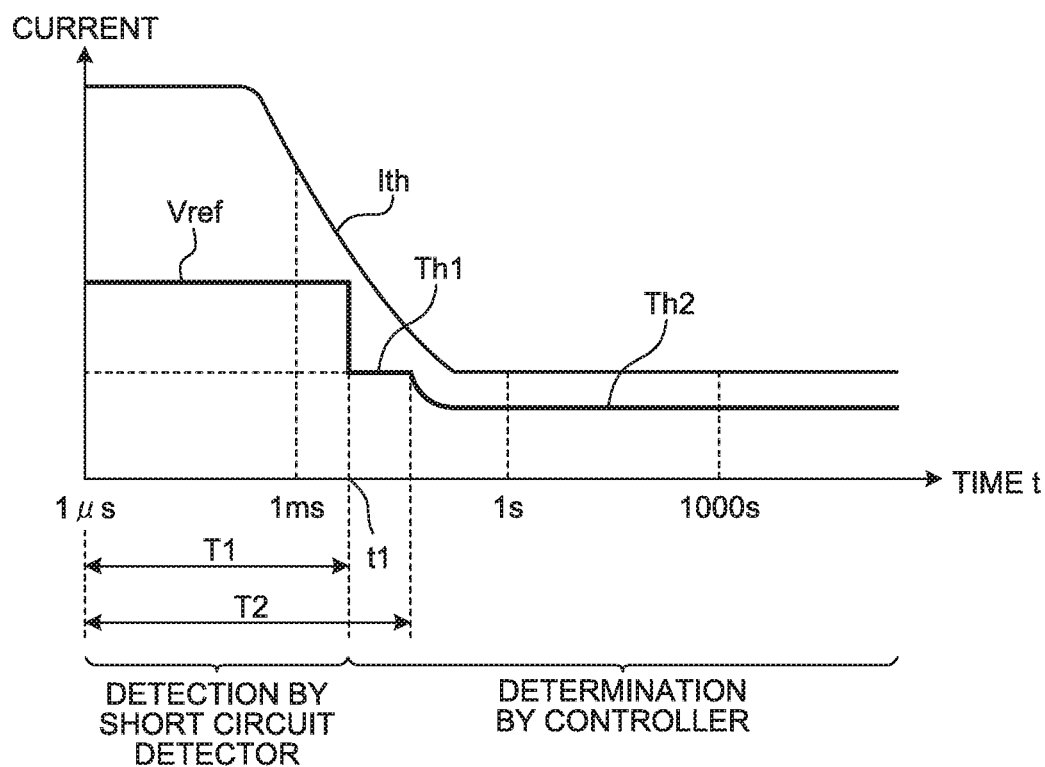
FIG. 4 is a diagram illustrating operating characteristics in the embodiment.

The short circuit detector 50 performs analog processing by the comparator 51. Thus, there is no need to perform A/D conversion as in the case of determining an over-current by the controller 40, and furthermore, there is also no need to perform a plurality of processes in synchronization with the clock frequency. Accordingly, the short circuit detector 50 can detect an over-current faster than the controller 40. The controller 40 performs A/D conversion by the current sensor 30. Thus, as illustrated in FIG. 4, the controller 40 needs at least the period T1 from the starting of the detection of load current to time t1 before an over-current is determined. Furthermore, when calculating the Joule heat, the controller 40 needs at least the period T2 that is longer than the period T1 because the amount of heat is calculated in conjunction with the lapse of time. Meanwhile, because the short circuit detector 50 performs the analog processing by the comparator 51, an over-current can be detected at an instant that the over-current occurs without needing the periods T1 and T2 as in the controller 40. Thus, the short circuit detector 50 can detect a sudden over-current due to a short circuit.

Figure 5:
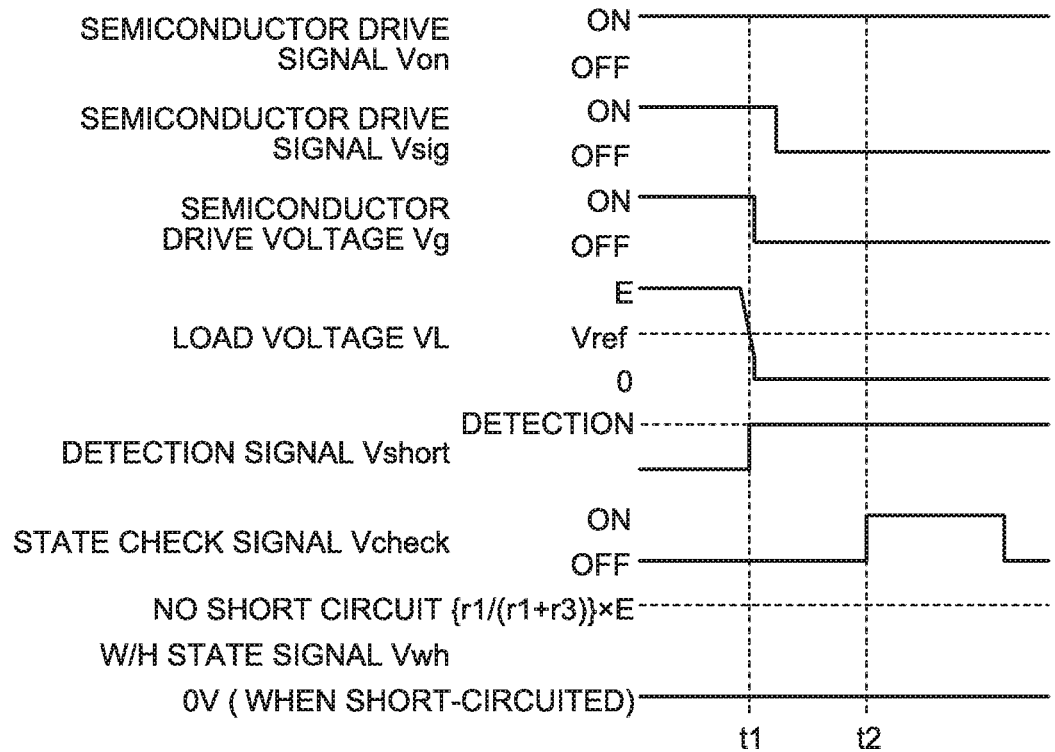
FIG. 5 is a timing chart illustrating short circuit detection performed by the short circuit detector in the embodiment.

Next, with reference to the timing chart illustrated in FIG. 5, an operation example performed in the semiconductor-switch control device 1 at the time of short circuit will be described. When a semiconductor drive signal Von indicative of turning on the FET 10 is input from an external device, which is not depicted, the controller 40 turns the FET 10 on and supplies electric power from the power source 2 to the load section 3. At this time, the short circuit detector 50 compares the analog signal of the load voltage VL with the reference voltage Vref and, when the analog signal of the load voltage VL is below the reference voltage Vref, outputs an analog detection signal (interruption signal; a high-level signal) Vshort indicating an over-current to the drive unit 20 and the controller 40 (time t1). The drive unit 20 applies, based on the detection signal (interruption signal) Vshort output from the short circuit detector 50, a semiconductor drive voltage Vg to the FET 10 and turns the FET 10 off. The controller 40 switches, based on the detection signal (interruption signal) Vshort output from the short circuit detector 50, the semiconductor drive signal Vsig from an on-state to an off-state. Then, the controller 40 outputs to the short circuit detector 50 a state check signal Vcheck to check whether the detection result by the short circuit detector 50 is correct (time t2). The short circuit detector 50 outputs, based on the state check signal Vcheck output from the controller 40, a wire harness (W/H) state signal Vwh as a detection check signal to the controller 40 (time t2). For example, when a short circuit has occurred, the short circuit detector 50 outputs the W/H state signal Vwh of 0 V to the controller 40. When a short circuit has not occurred, the short circuit detector 50 outputs to the controller 40 the W/H state signal Vwh indicating a voltage for which the voltage of a power source E (not depicted) coupled to the source terminal of the switching element 53 is divided by the resistor R3 (assumed to be a resistance value r3) coupled to the drain terminal of the switching element 53, and a resistor (assumed to be a resistance value r1) of the load section 3 (Expression (1)). The controller 40 determines, based on the W/H state signal Vwh output from the short circuit detector 50, whether the short circuit that the short circuit detector 50 has detected at the above-described time t1 is correct. For example, when the W/H state signal Vwh output from the short circuit detector 50 is 0 V, the controller 40 determines that the short circuit that the short circuit detector 50 detected at the above-described time t1 is correct, and maintains the interruption of current.

$$Vwh = \{r1/(r1+r3)\} \times E \qquad (1)$$

Figure 6:
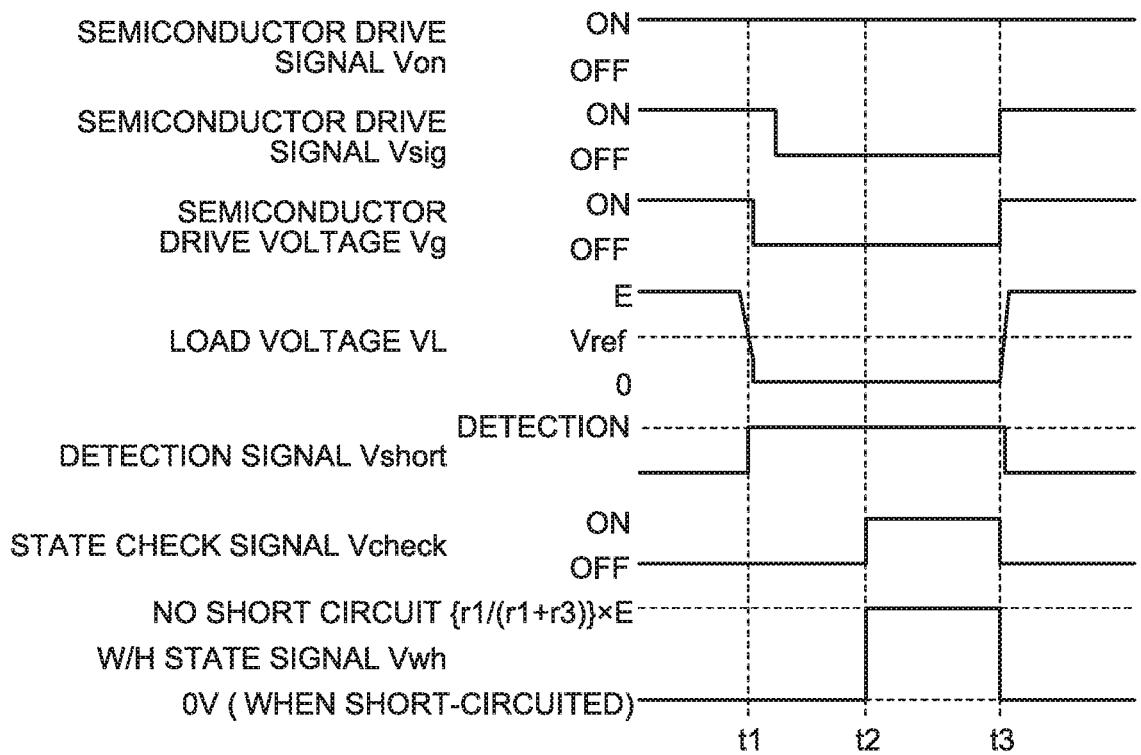
FIG. 6 is a timing chart illustrating false short circuit detection performed by the short circuit detector in the embodiment.

Meanwhile, as illustrated in FIG. 6, when the W/H state signal Vwh output from the short circuit detector 50 is at a voltage (a high-level voltage) equivalent to the voltage indicated by Expression (1), the controller 40 determines that the short circuit that the short circuit detector 50 detected at the above-described time t1 is incorrect (time t3). In this case, the controller 40 outputs the semiconductor drive signal Vsig indicative of turning on the FET 10 to the drive unit 20 (time t3). The drive unit 20 applies, based on the semiconductor drive signal Vsig output from the controller 40, the semiconductor drive voltage Vg to the FET 10 and turns the FET 10 on (time t3). As a result, the electric power is supplied from the power source 2 to the load section 3 again.

Figure 7:
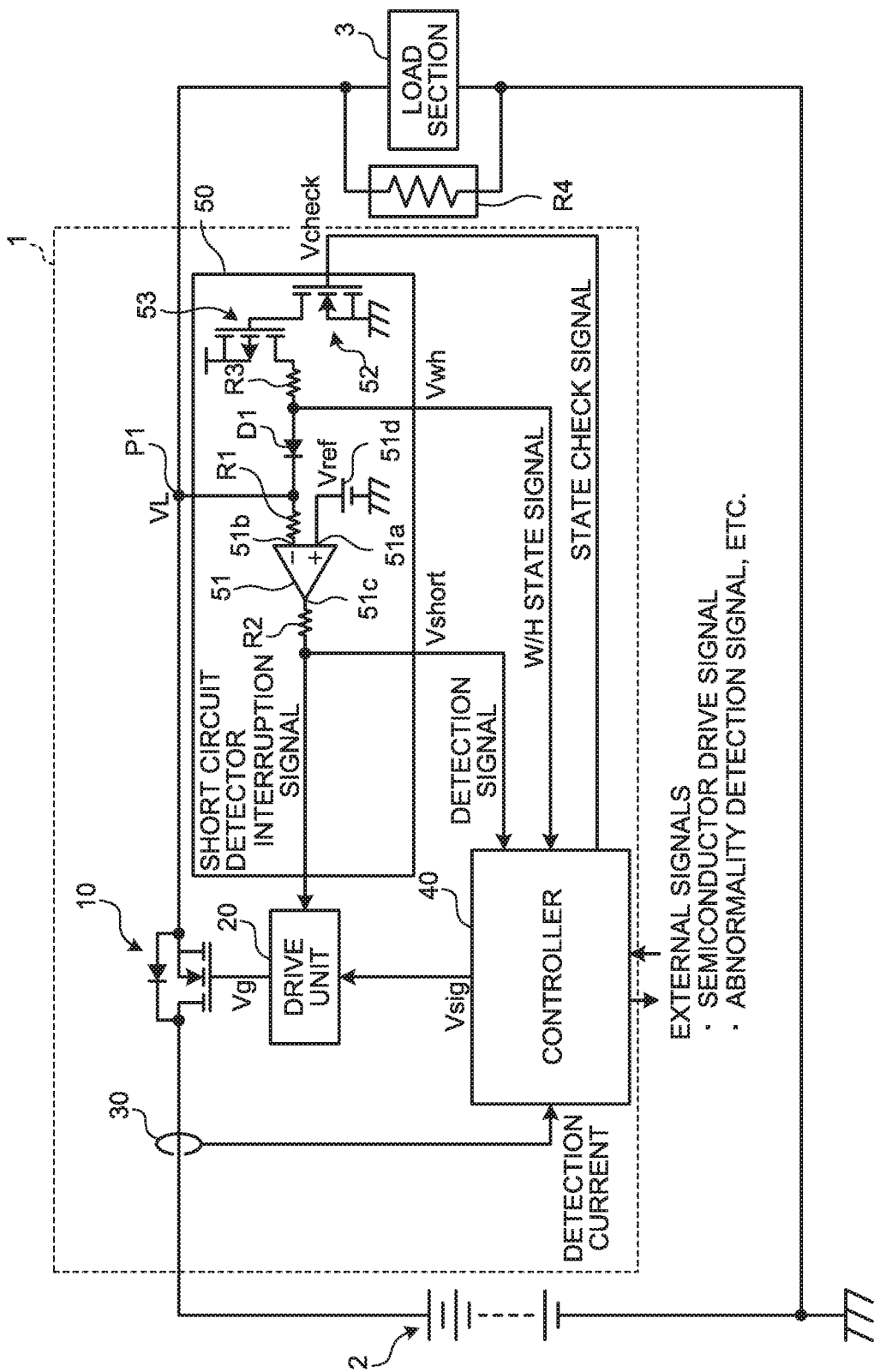
FIG. 7 is a circuit diagram illustrating a configuration example of the semiconductor-switch control device in the embodiment.

Furthermore, it may be checked whether the determination result of over-current by the controller 40 is correct. For example, as illustrated in FIG. 7, when it is assumed that the resistor of the load section 3 is r1, a resistor R4 that is a cause of an over-current due to an overload or the like is r2, the resistor R3 that is coupled to the drain terminal of the switching element 53 is r3, and a power source (not depicted) coupled to the source terminal of the switching element 53 is E, the W/H state signal Vwh is expressed by the following Expression (2).

$$\text{W/H state signal } Vwh = \{(r1 \times r2)/(r2 \times r3 + r1 \times r3 + r1 \times r2)\} \times E \qquad (2)$$

Figure 8:
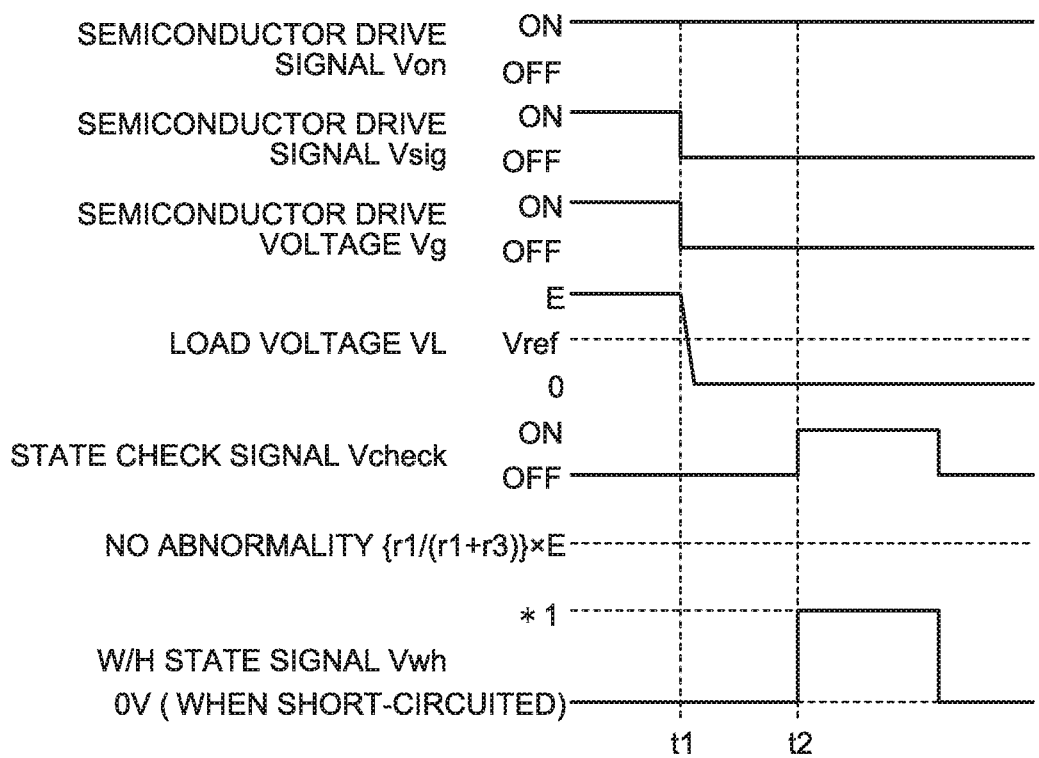
FIG. 8 is a timing chart illustrating over-current detection performed by a controller in the embodiment.

As illustrated in FIG. 8, the controller 40 determines the interruption of the FET 10 at the time t1 due to the lowering of the load voltage VL. Thereafter, at the time t2, the controller 40 outputs to the short circuit detector 50 the state check signal Vcheck to check whether the determination result of the controller 40 is correct. The short circuit detector 50 outputs, based on the state check signal Vcheck output from the controller 40, the W/H state signal Vwh obtained by the above-described Expression (2) to the controller 40 (time t2). For example, when an over-current has occurred due to the overload or the like, the short circuit detector 50 outputs the W/H state signal Vwh of a voltage (a voltage below the voltage obtained by Expression (1)) corresponding to the degree of the over-current to the controller 40. When an over-current has not occurred, the short circuit detector 50 outputs the W/H state signal Vwh indicating a voltage that is equivalent to the voltage obtained by Expression (1) to the controller 40. The controller 40 determines, based on the W/H state signal Vwh output from the short circuit detector 50, whether the determination result of the over-current that the controller 40 detected at the above-described time t1 is correct. For example, when the W/H state signal Vwh output from the short circuit detector 50 is below the voltage obtained by Expression (1), the controller 40 determines that the determination result of the over-current that the controller 40 detected at the above-described time t1 is correct. Thus, the controller 40 may, after the determination of over-current, check whether the determination result made by the controller 40 is correct by the short circuit detector 50.

As in the foregoing, the semiconductor-switch control device 1 in the embodiment includes the controller 40 that detects an analog signal of the load current, converts the detected analog signal into a digital signal, and determines an over-current based on the converted digital signal; the short circuit detector 50 that detects an analog signal of the load voltage VL, and detects an over-current based on the analog signal without converting the detected analog signal into a digital signal; and the drive unit 20 that drives the FET 10 based on the determination result of the over-current determined by the controller 40 or the detection result of the over-current detected by the short circuit detector 50. The controller 40 takes time before detecting an over-current than the short circuit detector 50 because the controller 40 converts the analog signal into the digital signal. However, performing digital processing makes complex calculation possible, and a temperature rise (Joule heat) by the lapse of time can be obtained, for example. Thus, the controller 40 can implement a fuse function and, because an erroneous interruption due to an instantaneous noise can be suppressed, the controller 40 can accurately detect an over-current. Meanwhile, because the short circuit detector 50 performs the analog processing, the short circuit detector 50 can detect an over-current in a shorter time than the controller 40. Accordingly, because the short circuit detector 50 can detect a sudden over-current due to a short circuit, the sudden over-current due to the short circuit can be suppressed. As just described, in the semiconductor-switch control device 1, the short circuit detector 50 and the controller 40 detect an over-current separately and independently. Thus, a sudden over-current as in a short circuit can be detected by the short circuit detector 50, and the temperature that rises due to an over-current and by the Joule heat in conjunction with the lapse of time can be determined by the controller 40. Consequently, because the semiconductor-switch control device 1 can properly interrupt an over-current and protect the circuit even when any types of over-current occurs, the semiconductor-switch control device 1 can improve the reliability of the system that supplies the electric power from the power source 2 to the load section 3.

In the semiconductor-switch control device 1, the controller 40 determines an over-current according to the Joule heat obtained based on the digital signal of the load voltage VL and the time elapsed after application of the load voltage VL. Thus, the semiconductor-switch control device 1 can accurately determine the temperature of the FET 10 that rises due to an over-current and by the Joule heat in conjunction with the lapse of time, or the temperature of an electric wire that is coupled to the load section 3 from the FET 10.

In the semiconductor-switch control device 1, the short circuit detector 50 includes the comparator 51 that, when the analog signal of the load voltage VL is below the predetermined reference voltage Vref, outputs to the drive unit 20 the detection signal indicating an over-current and, when the analog signal of the load voltage VL is equal to or greater than the reference voltage Vref, outputs to the drive unit 20 the detection signal indicating not being an over-current. Thus, because the short circuit detector 50 detects an over-current by the analog processing without needing the A/D conversion as in the controller 40, the short circuit detector 50 can detect an over-current at the instant that the over-current occurred. Accordingly, the short circuit detector 50 can detect a sudden over-current due to a short circuit.

In the semiconductor-switch control device 1, the short circuit detector 50 outputs the detection signal (interruption signal) indicating an over-current to the controller 40; the controller 40 outputs, based on the detection signal (interruption signal) output from the short circuit detector 50, the state check signal Vcheck to the short circuit detector 50; the short circuit detector 50 outputs, based on the state check signal Vcheck output from the controller 40, the W/H state signal (detection check signal) Vwh indicating whether the over-current has been detected to the controller 40; and the controller 40 determines, based on the W/H state signal Vwh output from the short circuit detector 50, the detection result of the over-current detected by the short circuit detector 50. Thus, when an over-current is erroneously detected by the short circuit detector 50 and the load current is interrupted, the semiconductor-switch control device 1 does not perform the determination of false detection by retries of supplying electricity again. Consequently, the semiconductor-switch control device 1 can safely release the interruption and supply electricity.

Modifications

Figure 9:
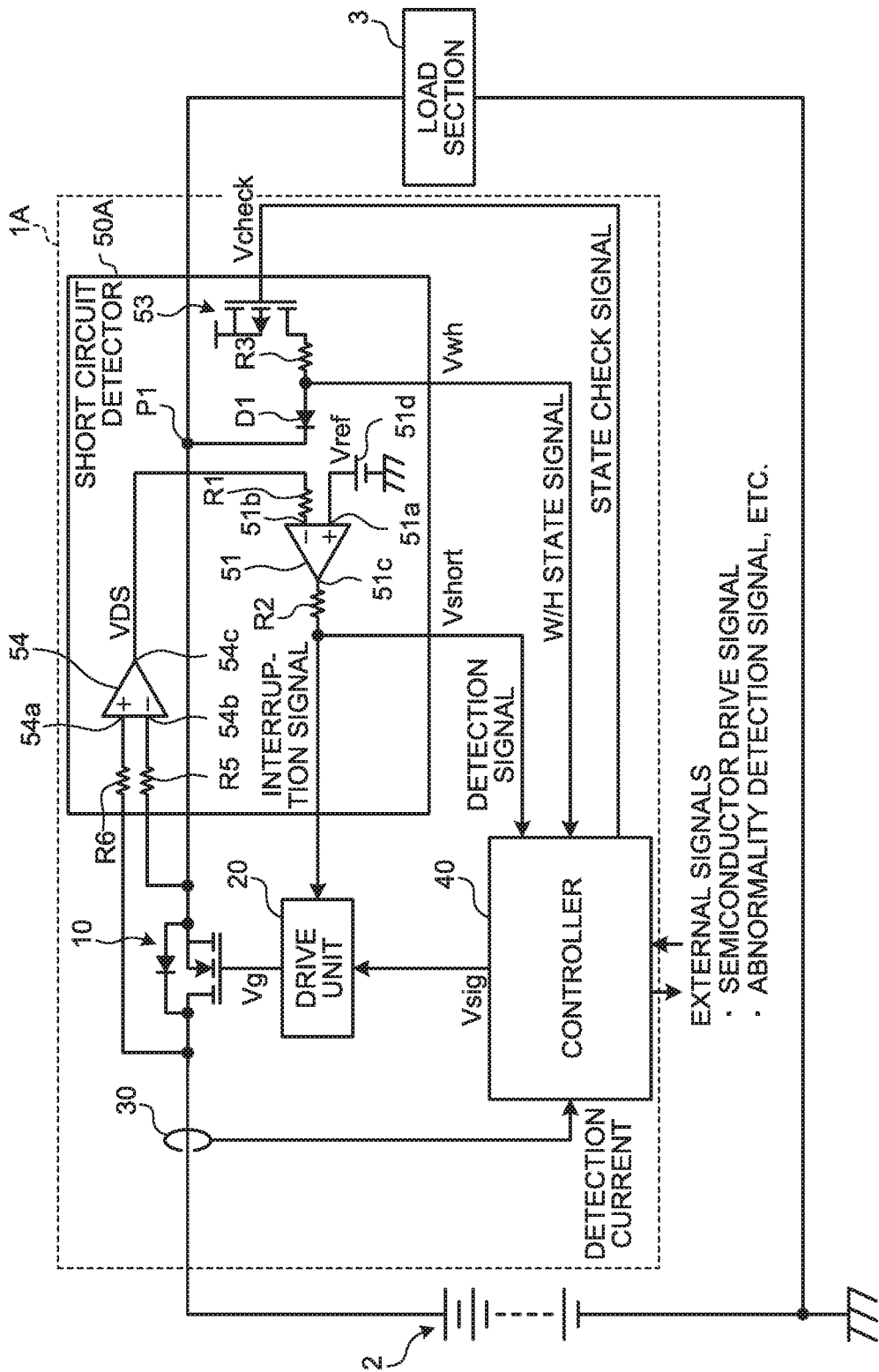
FIG. 9 is a circuit diagram illustrating a configuration example of a short circuit detector according to a modification.

Next, modifications of the embodiment will be described. As illustrated in FIG. 9, a semiconductor-switch control device 1A may detect a short circuit based on a potential difference between the drain terminal and the source terminal of the FET 10. For example, a short circuit detector 50A includes a comparator 54 that detects the potential difference (hereinafter referred to as an FET terminals voltage) between the drain terminal and the source terminal of the FET 10. The comparator 54 includes a positive input terminal 54a, a negative input terminal 54b, and an output terminal 54c, for example. In the comparator 54, the negative input terminal 54b is coupled to the source terminal side of the FET 10 via a resistor R5, the positive input terminal 54a is coupled to the drain terminal side of the FET 10 via a resistor R6, and the output terminal 54c is coupled to the negative input terminal 51b of the comparator 51 via the resistor R1. The comparator 51 compares an analog signal of the FET terminals voltage input from the comparator 54 via the negative input terminal 51b with the reference voltage Vref input from the positive input terminal 51a. Then, the comparator 51 outputs to the drive unit 20 the analog detection signal (interruption signal; a high-level signal) indicating an over-current when the analog signal of the FET terminals voltage is equal to or greater than the reference voltage Vref. The comparator 51 further outputs to the drive unit 20 the analog detection signal (a low-level signal) indicating not being an over-current when the analog signal of the FET terminals voltage is below the reference voltage Vref. As just described, the short circuit detector 50A may detect a short circuit based on the potential difference between the drain terminal and the source terminal of the FET 10.

Furthermore, the controller 40 has determined an over-current based on the detection current output from the current sensor 30. However, the embodiment is not limited thereto. For example, the controller 40 may determine an over-current based on a detection voltage output from a voltage sensor.

The short circuit detector 50 has detected an over-current based on the analog signal of the load voltage VL. However, the embodiment is not limited thereto. For example, the short circuit detector 50 may detect an over-current based on an analog signal of the load current. In this case, when the analog signal of the load current is equal to or greater than a predetermined reference current, the short circuit detector 50 outputs to the drive unit 20 the detection signal indicating an over-current and, when the analog signal of the load current is below the reference current, outputs to the drive unit 20 the detection signal indicating not being an over-current.

The comparator 51 has been described with an example that outputs the detection signal of either a high-level signal or a low-level signal depending on the load voltage VL. However, the embodiment is not limited thereto. For example, the comparator 51 may output the detection signal indicating an over-current when the over-current is detected, and may output no signal when an over-current is not detected.

The semiconductor-switch control device according to the present embodiment includes the determination unit that detects an analog signal of the load current or the load voltage, converts the detected analog signal into a digital signal, and determines an over-current based on the converted digital signal; and the detector that detects an analog signal of the load current or the load voltage and detects an over-current based on the analog signal without converting the detected analog signal into a digital signal, thereby enabling it to properly interrupt the over-current by the analog processing or the digital processing and protect the circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A semiconductor-switch control device comprising:
   a semiconductor switch configured to conduct or interrupt a load current that is an electric current flowing from a power source to a load section;
   a determination unit configured to detect an analog signal of the load current or of a load voltage that is a voltage applied to the load section, convert the detected analog signal into a digital signal, and determine an over-current based on the converted digital signal;
   a detector configured to detect the analog signal of the load current or the load voltage, and detect an over-current based on the analog signal without converting the detected analog signal into a digital signal; and
   a drive unit configured to drive the semiconductor switch based on a determination result of the over-current determined by the determination unit or a detection result of the over-current detected by the detector, wherein
   the detector includes a comparator configured to, when the analog signal of the load current is equal to or greater than a predetermined reference current or when the analog signal of the load voltage is below a predetermined reference voltage, output to the drive unit a detection signal indicating an over-current and, when the analog signal of the load current is below the reference current or when the analog signal of the load voltage is equal to or greater than the reference voltage, output to the drive unit a detection signal indicating not being an over-current,
   the detector outputs the detection signal indicating the over-current to the determination unit,
   the determination unit outputs, based on the detection signal indicating the over-current output from the detector, a state check signal to the detector,
   the detector outputs, based on the state check signal output from the determination unit, a detection check signal indicating whether the over-current has been detected to the determination unit, and the determination unit determines, based on the detection check signal output from the detector, a detection result of the over-current detected by the detector.

2. The semiconductor-switch control device according to claim 1, wherein the determination unit determines an over-current according to Joule heat obtained based on the digital signal of the load current or the load voltage and based on a time elapsed after application of the load voltage.

* * * * *